May 8, 1956

C. J. CLARK 2,744,537

AUTOMATIC PRESSURE REDUCING CUT OFF
VALVE FOR FLUID PRESSURE LINE
Filed Feb. 20, 1953

INVENTOR.
CYRUS J. CLARK,
BY

McMorrow, Berman & Davidson
ATTORNEYS.

United States Patent Office 2,744,537
Patented May 8, 1956

2,744,537

AUTOMATIC PRESSURE REDUCING CUT OFF VALVE FOR FLUID PRESSURE LINE

Cyrus J. Clark, Tad, W. Va.

Application February 20, 1953, Serial No. 337,970

1 Claim. (Cl. 137—462)

This invention relates to automatic cut off and pressure reducing valves and more particularly to a cut off and pressure reducing valve adapted to be connected into a fluid pressure line, such as a gas line, and operative to maintain a different fluid pressure in the line at one side of the valve than the fluid pressure in the line at the other side of the valve and close the line upon failure of fluid pressure in the line and maintain the line closed until the valve is manually reopened.

It is among the objects of the invention to provide an improved automatic cut off valve for a fluid pressure line, such as a gas pipe line, which can be easily connected into a pipe line and is held open by the pressure of fluid in the line; which automatically closes the line upon failure of fluid pressure in the line; which maintains the associated pressure line closed until the valve is manually reopened, so that fluid returning under pressure to the line will not escape through valves which may have been left open when the fluid pressure in the line fails; which is adjustable to cut off the associated fluid pressure line at various selected minimum pressures of the fluid in the line; which utilizes the fluid pressure in the line to control the opening and the closing of the valve; and which is simple and durable in construction, economical to manufacture, easy to install, and positive and effective in operation.

Other objects and advantages will become apparent from a consideration of the following description and the appended claim in conjunction with the accompanying drawing wherein:

Figure 1:
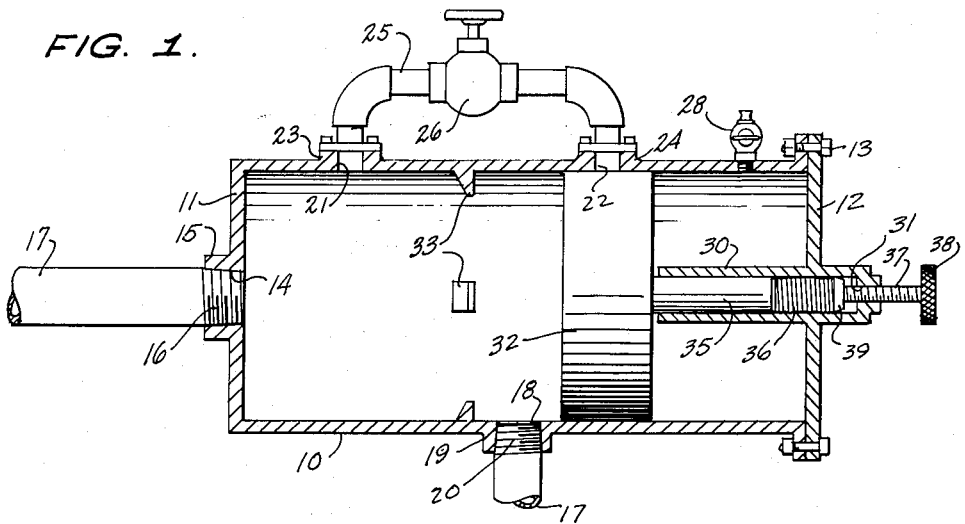
Figure 1 is a longitudinal medial cross sectional view through an automatic cut off valve illustrative of the invention.

With continued reference to the drawing, the illustrated valve comprises an elongated cylinder 10 having its ends closed by end walls 11 and 12 of which the end wall 12 is detachably secured to the cylinder by suitable means, such as the flange bolts 13. The end wall 11 is provided with an inlet port 14, preferably centrally located relative to the end wall, surrounded by an internally screw threaded boss 15 and one end 16 of the associated pipe line 17 is threaded into the boss 15. Adjacent its mid-length location the cylinder is provided with an outlet port 18, spaced longitudinally of the cylinder from the inlet port 14 and the outlet port 18 is surrounded by an internally screw threaded boss 19. The corresponding end 20 of the pipe line 17 is threaded into the boss 19, so that the valve is operatively connected into the pipe line. Bypass ports 21 and 22 are provided in the cylinder at locations spaced apart longitudinally of the cylinder and these ports are surrounded by bosses 23 and 24 respectively, externally of the cylinder. The port 21 is located near the end wall 11, while the port 22 is located about midway between the port 21 and the end wall 12. A by-pass conduit or pipe 25 is connected at one end to the boss 23 in communication with the bypass port 21, and at its other end to the boss 24 in communication with the bypass port 22 and a manually operated valve 26 is connected into the by-pass conduit 25 and operative to open and close the conduit upon manual operation of the valve.

A manually operated vent valve 28 is mounted on the cylinder in communication with the interior of the cylinder adjacent the end wall 12 of the cylinder for a purpose to be later described.

A sleeve 30 is mounted on the end wall 12 centrally of this end wall and extends perpendicularly from the end wall into the adjacent portion of the cylinder 10 and also extends outwardly of the end wall. At its end disposed outwardly of the end wall this sleeve 30 is provided with a coaxial, screw threaded hole or aperture 31. A piston 32 is disposed in the cylinder 10 for movements longitudinally of the cylinder and stop lugs 33 are disposed in the cylinder at locations angularly spaced apart around an internal circumference of the cylinder and are positioned close to the side of the outlet port 18 adjacent to the end wall 11.

The piston is movable in the cylinder between the lugs 33 and the end of the sleeve 30 adjacent the piston, this sleeve also constituting a stop means for the piston. When the piston is in the position at which it is stopped by the sleeve 30, it is disposed at the side of the outlet port 18 remote from the inlet port 14 and closes the bypass port 22, as illustrated in Figure 1.

The piston 32 has a short piston rod or plunger 35 slidably received in the sleeve 30 and a compression spring 36 is disposed in the sleeve 30 between the outer end of the sleeve and the end of the plunger 35 remote from the piston 32. An adjustment screw 37 is threaded through the tapped hole 31 in the outer end of the sleeve 30 and has on its outer end a knurled thumb wheel 38. A spring abutment 39 is mounted on the inner end of the screw 37 and bears against the adjacent end of the compression spring.

Figure 2:
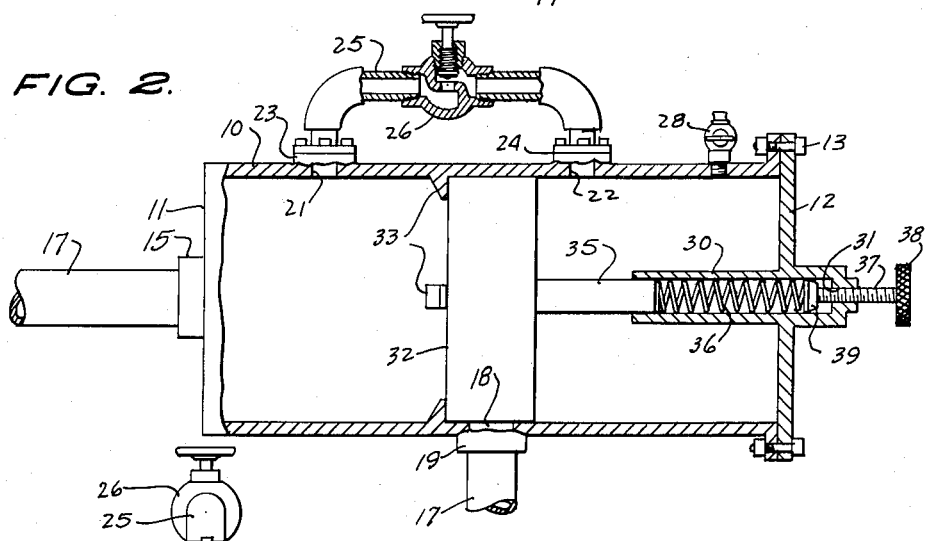
Figure 2 is a cross sectional view similar to Figure 1, but showing the valve parts in a different operative position from that illustrated in Figure 1.
Figure 3:
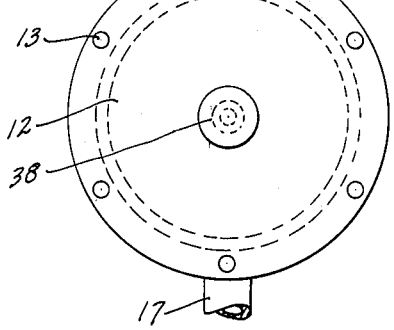
Figure 3 is an end elevational view of the valve looking at the right-hand end of the valve as illustrated in Figures 1 and 2.

The compression spring 36 resiliently urges the piston 32 away from its position as illustrated in Figure 1 in which the valve is opened and the pipe line end 16 connected with the pipe line end 20 through the interior of the valve cylinder 10, to the position illustrated in Figure 2 in which the piston is disposed against the stop lugs 33 and closes the outlet port 18 of the valve.

As long as the fluid pressure in the fluid pressure line 17 remains above a predetermined value, this pressure acting on the face of the piston 32 nearest the inlet port 14 will maintain the piston in its valve opening position, as illustrated in Figure 1, against the force of spring 36, and the piston will maintain the bypass port 22 closed. Upon failure of fluid pressure in the fluid pressure line 17, the spring 36 moves the piston to its position against the stop lugs 33 in which the piston cuts off the outlet port 18 of the valve. At the same time, the piston is disposed between the bypass ports 21 and 22, and, when pressure is restored to the fluid pressure line 17 the fluid under pressure will flow through the bypass ports and the conduit 25 to the space within the cylinder 10 between the piston and the end wall 12, so that the restored pressure acting on the face of the piston nearest the inlet port 14 will be counterbalanced by the pressure acting on the opposite face of the piston and will not be able to move the piston away from its valve closing position. While the effective area at the side of the piston remote from the inlet port 14 is smaller than the effective area of the face of the piston nearest the inlet port by the cross sectional area of the stem or plunger 35, this difference in effective piston areas is compensated by the force of the spring 36, so that the piston will not be moved to its valve opening position until the valve is manually reset.

In order to manually reset the valve after pressure has failed in the fluid pressure line 17 and has been restored to the line, the valve 26 is first manually closed, cutting off the communication through the conduit 25 from the bypass 21 to the bypass port 22 and the vent valve 28 is then opened, venting the fluid in the space within the cylinder 10 between the piston and the end wall 12. The fluid pressure now acting on the face of the piston nearest the inlet port 14 will force the piston toward the end wall 12 until the piston is stopped by the adjacent end of the sleeve 30, thus restoring the piston to the valve opening position illustrated in Figure 1. The valve is now restored to its automatically operative condition by closing the vent valve 28 and reopening the valve 26, it being noted that the bypass port 22 is now closed by the piston, so that the fluid under pressure will not flow to the space within the cylinder between the piston and the end wall 12.

The fluid pressure in the line 17 at which the spring acts to move the piston from its valve opening position, as illustrated in Figure 1, to its valve closing position, as illustrated in Figure 2, is adjusted by threading the adjusting screw 37 inwardly or outwardly of the corresponding end of the sleeve 30 through the screw threaded aperture 31, so that the valve can be adjusted to close at various selected minimum pressures of the fluid in the fluid pressure line and the fluid pressure thus does not have to completely fail in order for the valve to close.

In order to use the valve as a pressure reducing valve, the screw 37 is screwed inwardly or outwardly of the nut 31 by the thumb wheel 38 to adjust the loading on spring 36. Spring 36 then urges piston 32 toward stops 33 by an adjusted spring pressure against the fluid pressure in the chamber between piston 32 and cylinder head 11 to partly cover the port 18, thereby reducing the flow of gas through this port from the position of line 17 connected to cylinder head 11 to the portion of the line connected to the side wall of cylinder 10.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In an automatic cut-off valve, a cylinder having a side wall and first and second end walls, a fluid pressure inlet port in said first end wall, an outlet port in said side wall substantially midway between said end walls, a pair of first and second by-pass ports in said side wall, said first by-pass port being located between said first end wall and said outlet port and said second by-pass port being located between said outlet port and said second end wall, a single by-pass pipe extending between and connecting said by-pass ports, a manual valve connected in said by-pass pipe, a sleeve mounted axially on and extending through said second end wall, said sleeve having an open inner end terminating at a point spaced from and between said second end wall and said outlet port and serving as a piston stop, said sleeve having a closed outer end, stop lugs on said cylinder side wall close to the side of the outlet port facing said first end wall, a piston working in said cylinder between said stop lugs and the inner end of the sleeve and arranged to close the outlet port only when engaged with the stop lugs, and to open the outlet port and close said second by-pass port when engaged with the inner end of the sleeve, a piston rod fixed on a side of the piston and sliding in said sleeve, a compression spring in said sleeve having an inner end engaging the piston rod and having an outer end, and an adjusting screw threaded through the closed outer end of the sleeve having an abutment engaging the outer end of the spring.

References Cited in the file of this patent

UNITED STATES PATENTS

| | | |
|---|---|---|
| 821,867 | Farmer | May 29, 1906 |
| 1,501,331 | Gulick | July 15, 1924 |
| 1,579,951 | Polek | Apr. 6, 1926 |
| 1,724,389 | Abel | Aug. 13, 1929 |
| 1,791,980 | Shea | Feb. 10, 1931 |
| 2,071,969 | Diescher | Feb. 23, 1937 |
| 2,201,523 | Derrig | May 21, 1940 |

FOREIGN PATENTS

| | | |
|---|---|---|
| 343,683 | Germany | Nov. 7, 1921 |